Dec. 25, 1934.  R. O. VANDERCOOK ET AL  1,985,701

PROOF PRESS

Filed Oct. 10, 1927  8 Sheets-Sheet 3

Inventors:—
Robert O. Vandercook,
Edward O. Vandercook,
Frederick R. Vandercook,
David D. Vandercook, By A. Miner Belfield Atty.

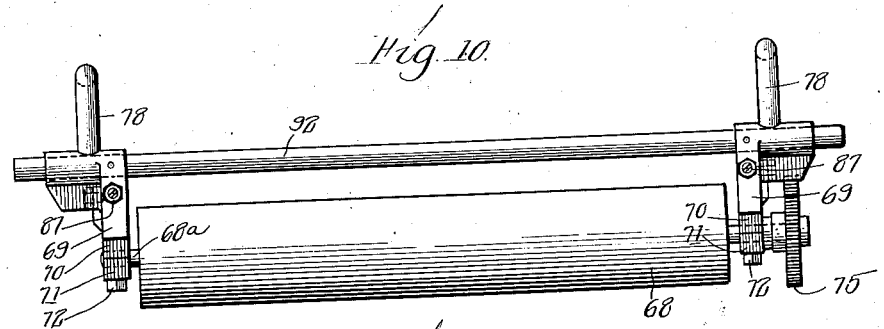
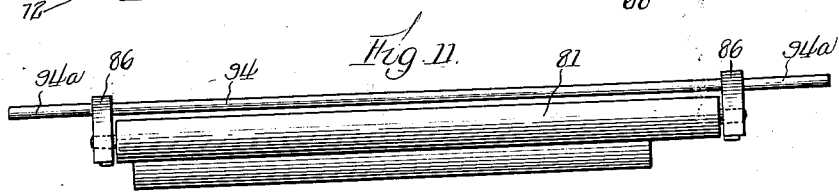
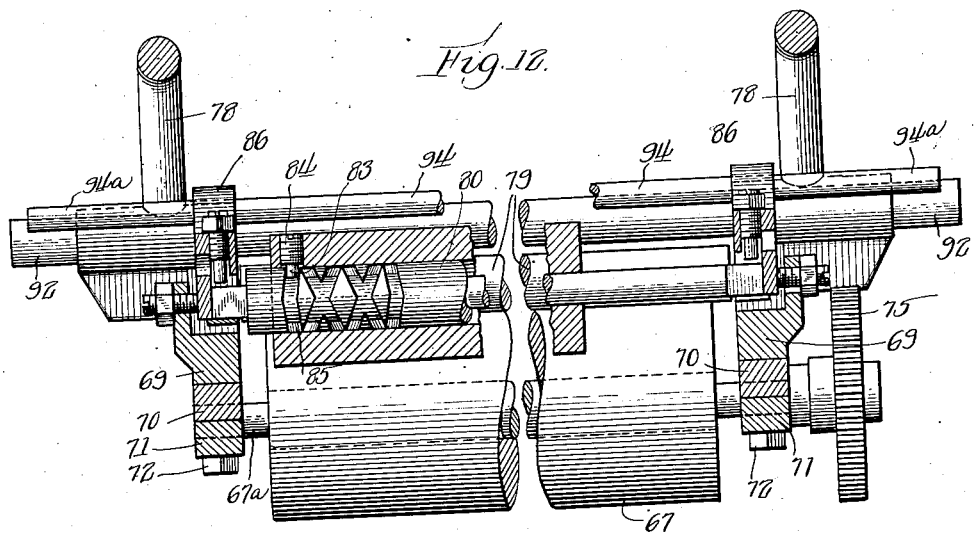
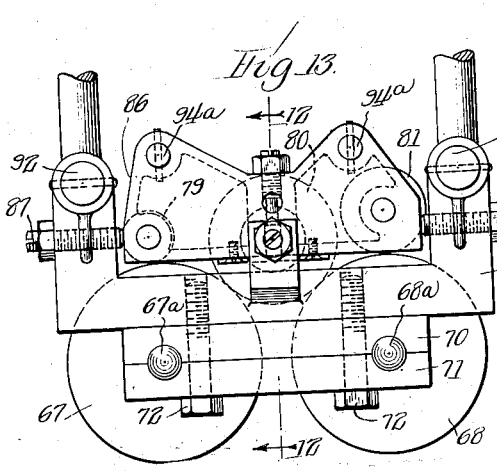
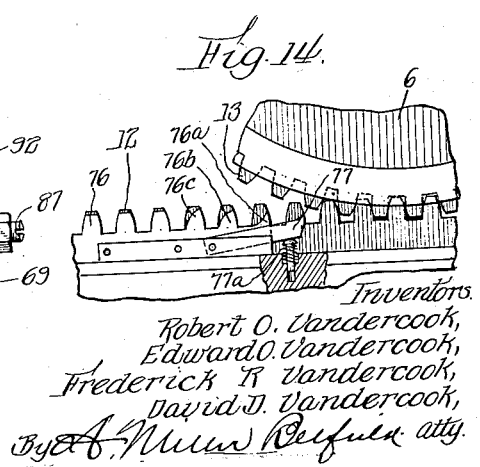

Patented Dec. 25, 1934

1,985,701

UNITED STATES PATENT OFFICE 1,985,701

PROOF PRESS

Robert O. Vandercook, Edward O. Vandercook, Frederick R. Vandercook, and David D. Vandercook, Chicago, Ill.

Application October 10, 1927, Serial No. 225,287

28 Claims. (Cl. 101—269)

Our invention relates to proof presses.

One of the objects of the invention is to provide a simple, practical and advantageous construction of proof press.

Another object of the invention is to arrange for the operation of the press so that the printing element, such as the roller, may be readily lifted so as to avoid the form, whenever desired, on the out or printing stroke of such printing element or roller.

Another object of the invention is to arrange for the simple and effective automatic lifting of the printing element or roller on the back stroke, after the proof has been printed by the forward or out stroke of such element or roller.

Another object of the invention is to arrange for the effective operation and control and inking of the inking rollers.

Another object of the invention is to arrange for the ready lifting of certain of the inking rollers so that they will not crease or otherwise injure other rollers.

Another object of the invention is to arrange for the easy and ready lifting of all of the inking rollers.

Another object of the invention is to arrange for the driving or rotation of the inking rollers either by power driven means or by the operation of the press.

Another object of the invention is to arrange for the ready bodily removal of the inking rollers, or certain of them, to permit them to be washed, or the ink changed, or for other purposes.

In the accompanying drawings:

Fig. 9 is a view of a detail of construction, said Figure being taken on line 9—9 in Fig. 1;

Fig. 10 is a side elevation of certain inking rollers removed from the machine;

Fig 11 is a side elevation of other inking rollers removed from the machine;

Fig. 12 is a sectional view showing the rollers and frame therefor illustrated in Fig. 10, said Fig. 12 being taken on line 12—12 in Fig. 13;

Fig. 13 is an end view of the mechanism shown in Fig. 12, and

Fig. 14 is a view of a detail of construction.

Fig. 15 is a modification of the arrangement shown in Fig. 13; and

Fig. 16 is a detail of construction.

Figure 1:
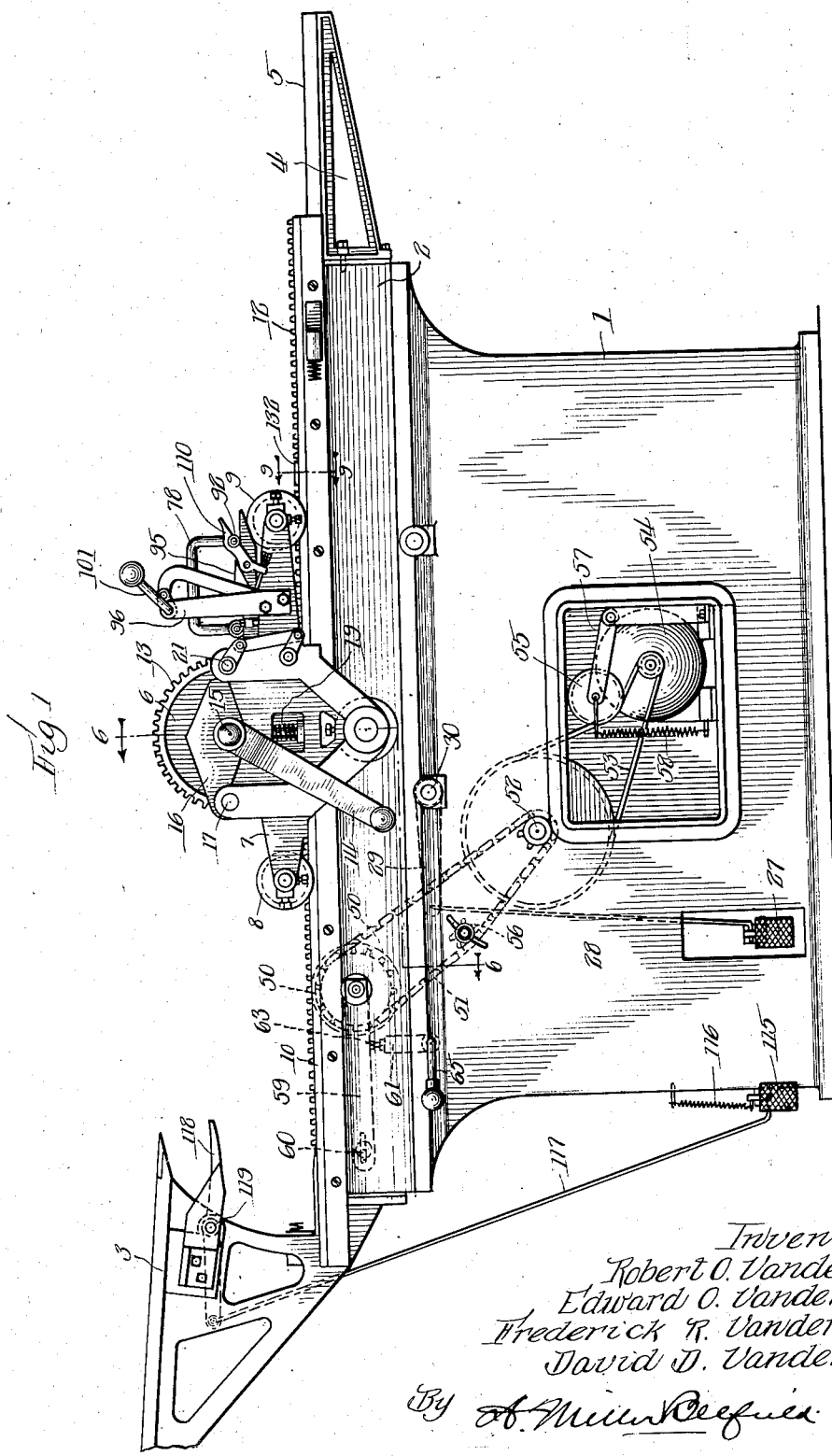
Fig. 1 is a side elevation of a proof press embodying our invention.

Referring to the drawings, we show a machine having a main body portion 1 and a bed 2. At one end, the lefthand end in Fig. 1, there is shown a paper support 3 on which is to be mounted the paper to be fed to the press for the taking of proofs. At the other end, the righthand end in Fig. 1, there is shown a bracket 4 having a holder or plate 5 on which is to be delivered the sheets on which the proof has been printed.

A printing element or roll 6 is shown mounted above the bed 2 and arranged for travel along the same. This roller or cylinder 6 is mounted on a traveling frame 7, which is provided with wheels 8, 8 and 9, 9 running on tracks 10, 10 at opposite sides of the bed 2, so that the traveling carriage 7 may be moved back and forth along the bed 2 and over the form which is understood to be properly placed in position on said bed, said form being shown in the drawings (Fig. 2) at 11. A rack 12 is provided at one side of the machine and a gear 13 is provided on the rotary cylinder 6 and the latter is provided with a handle 14 by which the cylinder 6 may be turned and be caused to move in one direction or the other over the bed 2, as desired.

The cylinder 6 is preferably arranged so that it may be lifted from the form, if desired, on the forward or printing stroke or movement, that is, on the stroke or movement to the right, referring to Fig. 1, during which stroke or movement the proof will be printed when the machine is operated so as to print. By thus arranging so that the cylinder may be lifted during the forward or printing stroke, at such times, of course, the proof will not be printed, because the paper will be elevated above the form on the bed. This operation is desirable, however, in order that the form may be inked preparatory to printing by the inking rollers, it being seen that by moving the carriage carrying the cylinder 6 and the inking rollers, which will be described hereinafter, in a forward direction with the cylinder elevated, the form may be inked as much as desired by the inking rollers. The arrangement also preferably provides for the automatic lifting of the printing cylinder 6 upon each return stroke, so that when the apparatus is arranged for printing and the cylinder is down so that the paper carried by it will print by traveling over the form, the cylinder will be automatically lifted on the return stroke so that there will be no interference or spoiling of the printing done by the forward stroke.

Figure 7:
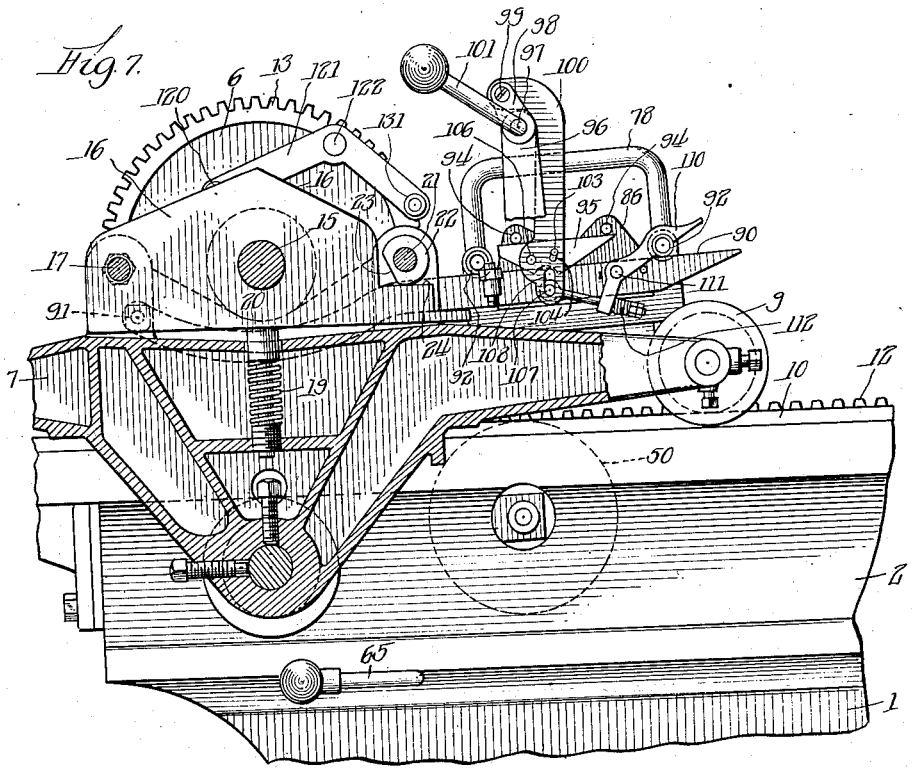
Fig. 7 is a cross section taken on line 7—7 in Fig. 2.

In the arrangement shown, the cylinder 6 has its axis 15 mounted in the side members 16 of the traveling carriage 7 and these members 16 are pivoted at 17 so that they may be elevated or lowered to raise and lower the cylinder 6 (Fig. 7). Springs 19 are arranged to act upon a piston head 20, which in turn acts on the underside of members 16, so that the spring 19 tends normally to elevate members 16 and thereby lift the cylinder 6. A rock shaft 21 carries cam members 22 having flat surfaces 23 cooperating with surfaces or abutments 24 on the members 16. Thus, by turning shaft 21 so that surfaces 23 will come adjacent to surfaces 24, springs 19 may elevate members 16 and thereby lift the roller or cylinder 6. Similarly, by turning shaft 21 so that the round or remaining portion of cams 22 will contact with surfaces 24, the members 16 will be depressed and cylinder 16 will be accordingly lowered and thus placed in position to operate upon the printing form carried by the bed 2.

Figure 4:
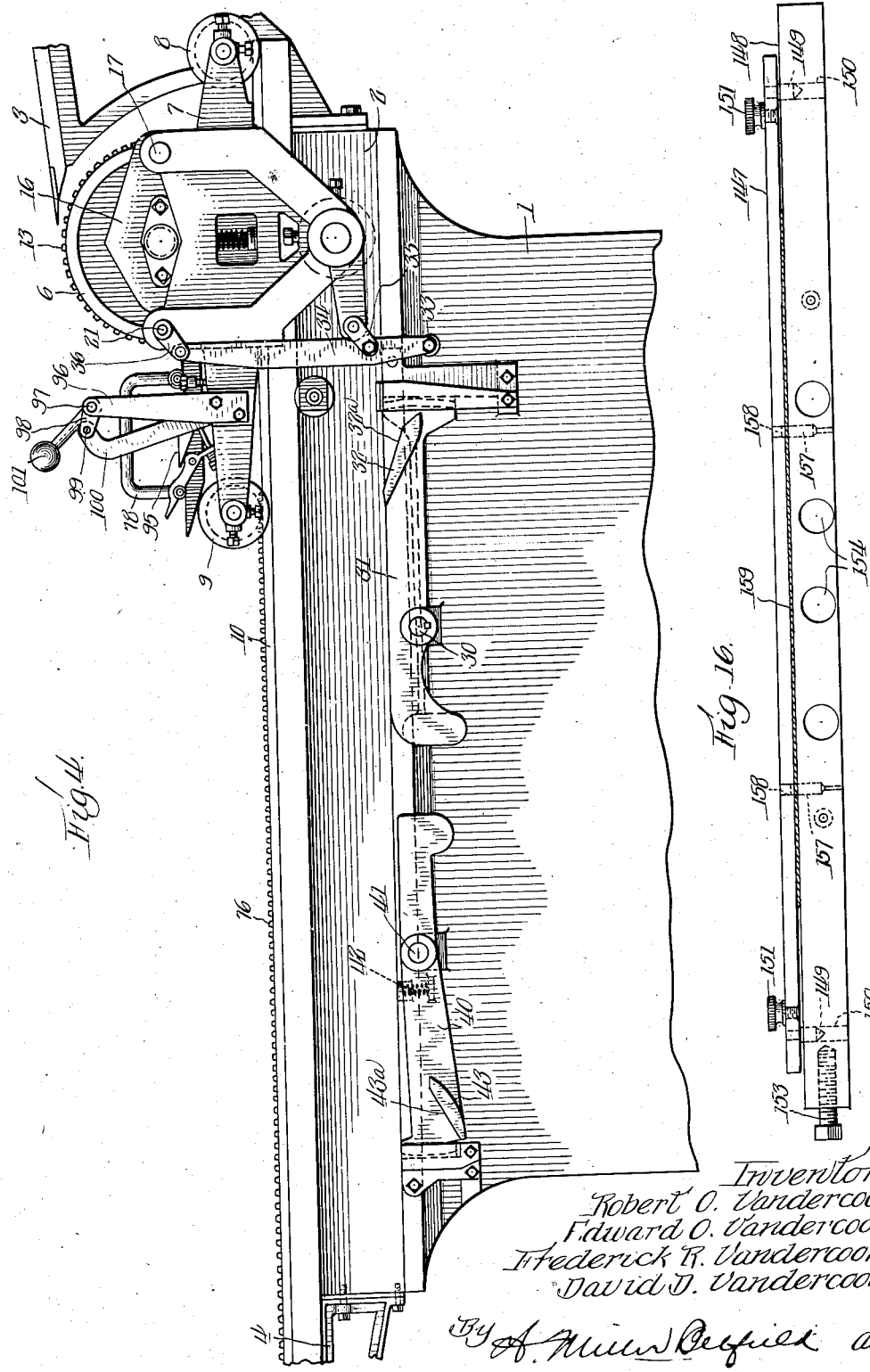
Fig. 4 is a side elevation of the press looked at from the side opposite the side shown in Figs. 1 and 3.

Shaft 21 is controlled by a foot lever 27 (Fig. 1) projecting from one side of the machine and this lever is connected by link 28 with an arm 29 which is carried by shaft 30 so that by operating lever 27, arm 29 may be swung down and shaft 30 turned so that a lever 31 (Fig. 4) on shaft 30 will be swung to bring cam 32 on said lever 31 into and out of the path of travel of a roller 33 on an arm 34 connected to links 35, 36 whereof the link 36 is on the end of shaft 21. Thus, when foot lever 27 is up, cylinder 6 will be down because cam 32 will be in an elevated position (as shown in Fig. 4) and roller 33 will pass beneath it when carriage 7 is outwardly or in a printing direction (to the left in Fig. 4) as a result of which arm 34 will remain in a down position and shaft 21 in a position (shown in Fig. 7) in which the round portion of cam 22 is in contact with abutment 24. However, when foot lever 27 is depressed, cylinder 6 will be lifted so as to raise the paper from the form when the carriage 7 is moved to the left (Fig. 4) or as it may be termed, moved in a printing direction. This is due to the fact that when foot lever 27 is depressed, it will cause arm 31 to swing down and place cam 32 in the path of roller 33 as the latter moves outwardly, as a result of which roller 33 will slide upwardly on inclined cam surface 32ª, thereby forcing arm 34 upwardly and turning shaft 21 in a position causing flat or cutaway surface 23 to contact with surface 24 and thereby permit springs 19 to swing members 16 upwardly and lift cylinder 6. Thus the outward movement of the traveling carriage may take place with the printing roller 6, in a down position to perform a printing operation, or it may take place with the printing roller in an up position so that printing will not be done, this being according as the foot lever 27 is in an up or a down position.

When the printing movement or stroke takes place with the printing roller 6 in an up or non-printing position, the roller will remain automatically in this position during substantially the entire printing stroke and also during the return stroke. However, when the outward or printing stroke takes place with the printing cylinder in a down or printing position, said roller will be automatically elevated at or near the outward end of the printing movement, so that the return stroke will be with the printing cylinder elevated, notwithstanding the printing stroke was with that cylinder depressed.

This may be accomplished by suitable mechanism at or near the outward end of the printing stroke, as, for example, a swinging lever 40 pivotally mounted on a shaft 41 and controlled by a spring 42, so that lever 40 is normally maintained in a lowered position, that is, with its lefthand end, Fig. 4, downwardly. A cam 43 is carried at the end of lever 40 and this cam 43 is in such position that when the traveling carriage with its roller 6 is proceeding outwardly with the cylinder in non-printing position and the roller 33 elevated, said roller 33 will pass over the top of cam 43 and not be operated by the same, so that roller 33 will maintain the same position on the return stroke and the cylinder 6 will accordingly be elevated and in non-printing position on such return stroke. However, when the printing cylinder 6 is in a lowered or printing position on the out-stroke, roller 33 will strike the underside of cam 43 and will move said cam upwardly, thereby swinging lever 40 so that roller 33 may pass beyond the outer or far end of cam 43. However, when roller 33 passes beyond the end of cam 43, spring 42 will depress the cam end of lever 40 and the roller 33 on its back or return stroke will strike against the cam surface 43ª, as a result of which roller 33 will be moved upwardly and arm 34 will be lifted and will cooperate with the mechanism, as previously described, so as to permit springs 19 to elevate members 16 and thereby cause the printing cylinder to be lifted so that it will return in an elevated or non-printing position.

Figure 5:
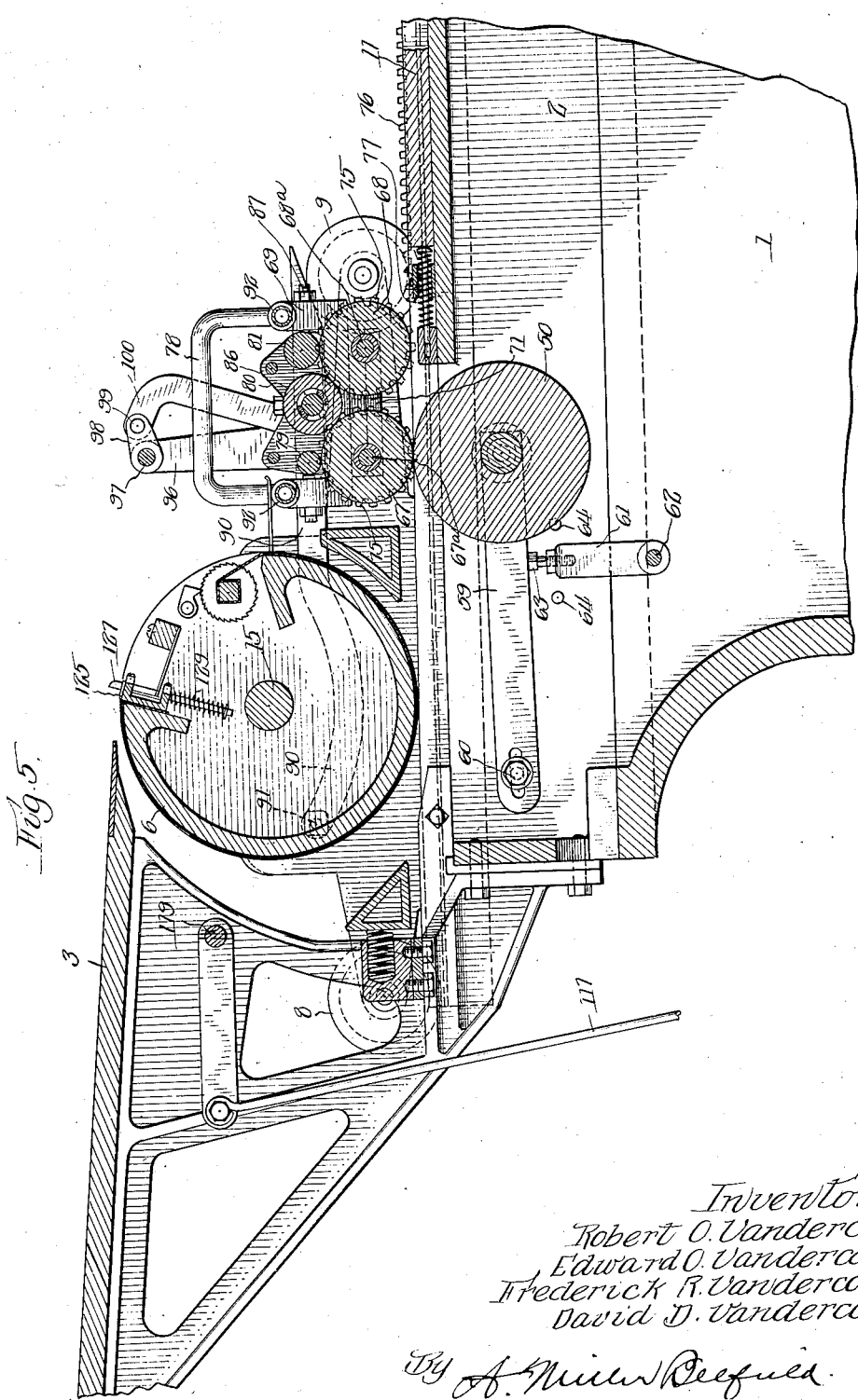
Fig. 5 is a vertical section taken on line 5—5 in Fig. 2.
Figure 6:
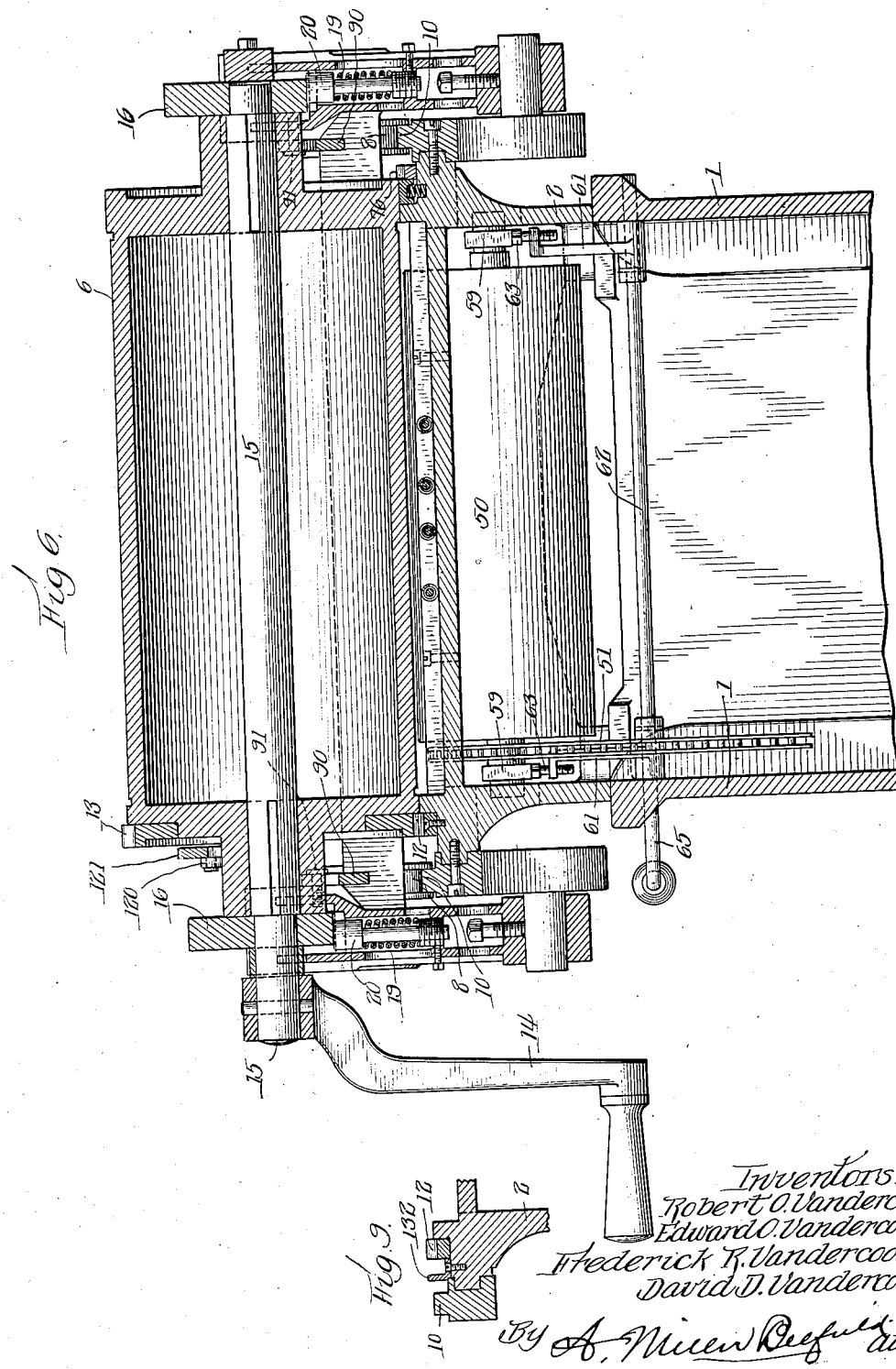
Fig. 6 is a cross section taken on line 6—6 in Fig. 1, but on an enlarged scale.
Figure 8:
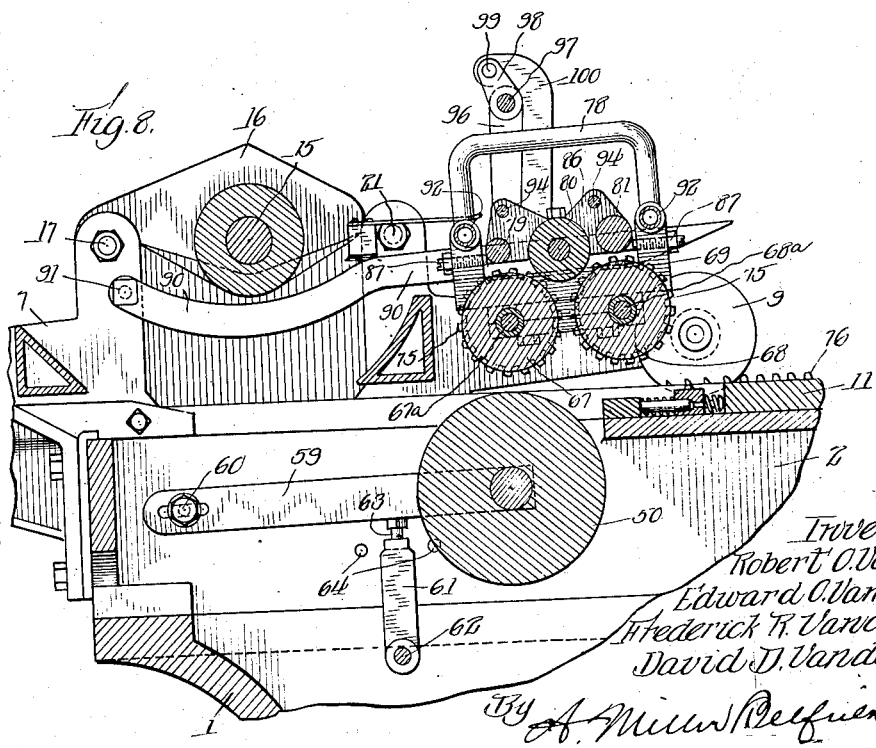
Fig. 8 is a cross section taken on line 8—8 in Fig. 2.

Reference will now be made to the inking mechanism. Referring first to Figs. 1, 5 and 8, we show an inking roll 50, arranged in connection with the frame or bed of the machine so as to cooperate with inkling rollers on the traveling carriage 7 carrying the printing roll, as previously referred to. This inking roll 50 is preferably driven continuously and to such end may be connected by a sprocket chain 51 with a drive shaft 52, which is driven by a belt 53 running to a prime mover, such as an electric motor 54, which is shown mounted on the bed 1 of the machine. An idler 55 is arranged to take up slack of the belt 53 and an idler 56 is arranged to take up slack in the sprocket chain 51. The idler 55 may be mounted on a pivotally supported arm 57 controlled by a spring 58.

For the purpose of permitting adjustment the inking roll 50 may be mounted on a swinging arm 59 pivoted at 60 and held normally in position by a second swinging arm 61. The latter is pivotally mounted on a shaft 62 and is preferably provided with an adjusting screw 63 adapted to make contact with and cooperate with swinging arm 59. Stops 64, 64 are arranged on opposite sides of the arm 61. A hand lever 65 is preferably mounted on the end of shaft 62 so that shaft 62 may be turned by hand lever 65. Thus, by turning shaft 62 in one way or the other the arm 61 is caused to swing to one side or the other so as to make contact with one of the stops 64 and in this position the inking roller 50 will be lowered slightly so as to be out of contact with other inking rollers to be presently described. When handle 65 is adjusted so as to cause arm 61 to stand upright, as shown in Fig. 5, the adjusting screw 63 will hold arm 59 in an elevated position so as to raise inking roller 50 to make contact with the other rollers referred to. Adjusting screw 63 may be adjusted so as to secure the desired accurate contact between roll 50 and the other rolls mentioned. By this arrangement the roll 50 may be rotated continuously and may also be adjusted to a moderate extent vertically so as to be in position to cooperate or not to cooperate with other inking rolls.

The other inking rolls referred to are the rolls 67, 68, Figs. 3, 5, 8 and 13. These rolls are carried by a roll frame 69, which is preferably mounted on and carried by the traveling carriage 7, but which is preferably made adjustable relatively to said carriage and also preferably made bodily removable therefrom. The roll frame or holder 69 may carry the rolls 67 and 68 by having underneath bearings for the same, which may be formed by plates 70 and 71 arranged on the underside of holder 69 and secured in position by bolts 72, the shafts or spindles 67a and 68a being between these plates or members 70 and 71.

Figure 3:
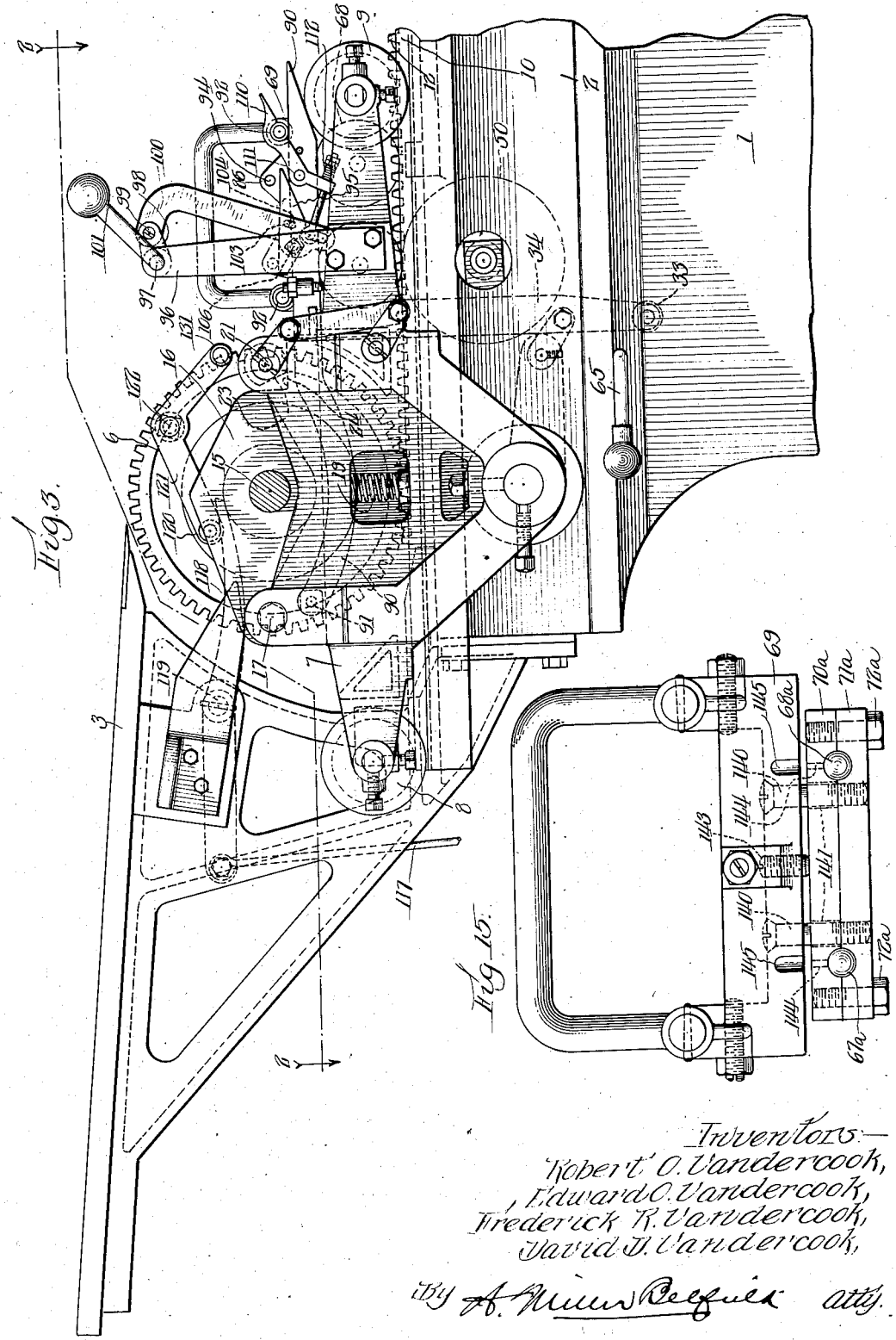
Fig. 3 is a side elevation of an end portion of the device.

When the traveling carriage 7 is at its inner endmost position, as shown in Figs. 3 and 5, the roll 50 will be in contact with the rolls 67 and 68 when said roll 50 is adjusted to its upper or inking position, as shown in Fig. 5. In this condition the roll 50 will continuously turn the roll 67, which, through another roll to be described, will turn the roll 68 and thus the two rolls 67 and 68 will be continuously turned and the ink spread on them as long as may be desired while the printing cylinder is in its innermost position.

The rolls 67 and 68 are preferably provided with gear teeth or pinions 75, 75 which mesh with a rack 76 on the machine frame 2. In this way the rolls 67 and 68 will be turned by the movement of the carriage 7 over the bed of the machine, this turning being due to the pinions 75 traveling over rack 76, the roll 67 at such time being separated from roll 50 and hence not receiving any turning action from the same.

Figure 2:
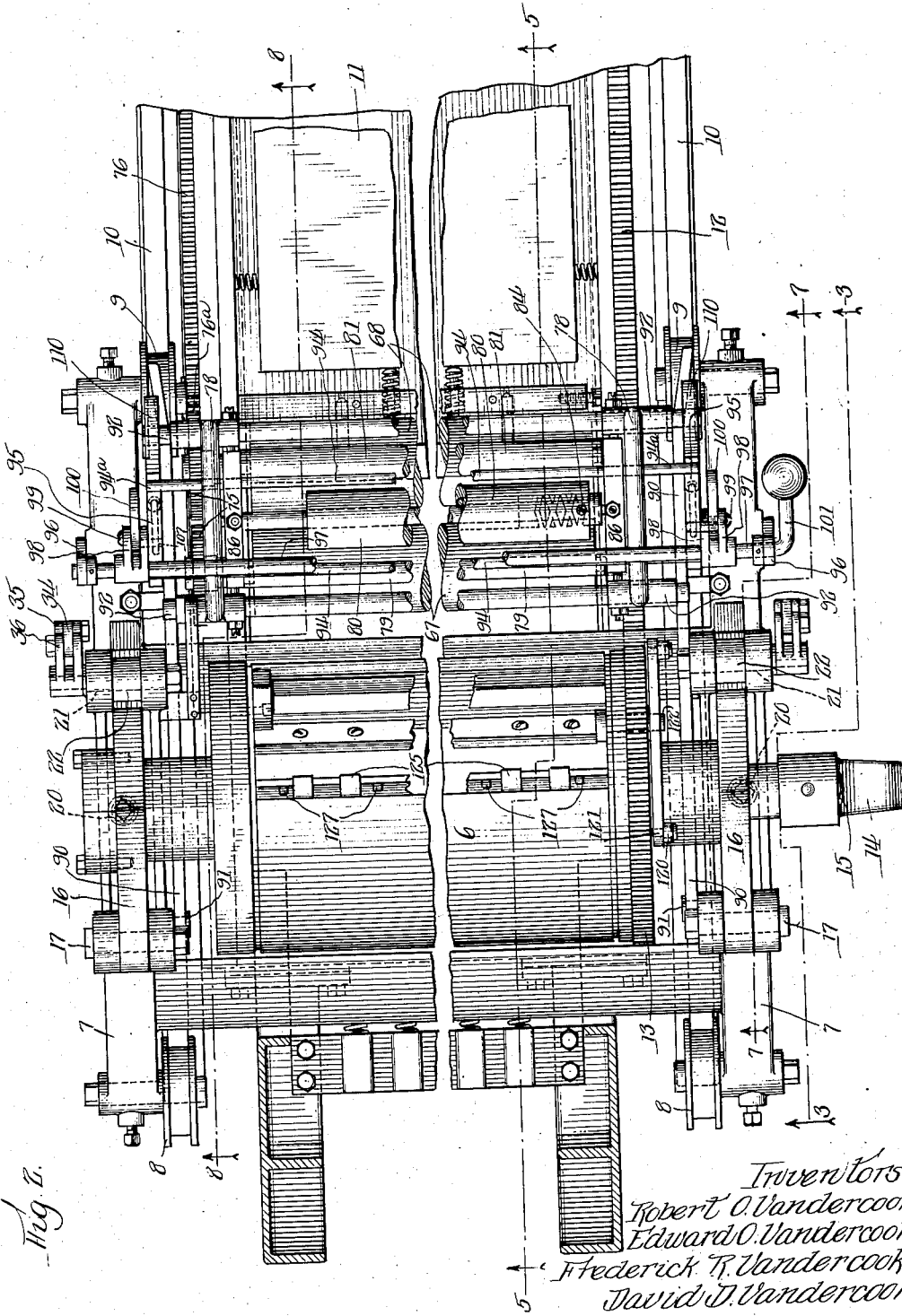
Fig. 2 is a plan view of the central portion of the same on an enlarged scale, Fig. 2 being taken on line 2—2 in Fig. 3.

To insure inking roll teeth 75 meshing properly with rack 76 when inking carriage begins to travel over rack 76 and inking rolls 67 and 68 are to be turned by rack 76 instead of by roll 50, a starting tooth arrangement is provided at end of rack 76 (Figs. 2, 5 and 14). This consists of several teeth 76a, 76b and 76c, more or less cut away, the end ones being most cut, so that if gear teeth 75 do not register so as to mesh properly with teeth 76, the cut away portions of these starting teeth will accommodate the out of register teeth 75 and adjust them into place. A pivoted arm or lever 77 controlled by spring 77a is arranged to engage the inking roll teeth 75 and assist in bringing them into proper mesh with rack teeth 76.

The roll frame or holder 69 is preferably provided with handles 78 by which it may be bodily lifted and even removed from the carriage 7, as will be more fully pointed out hereinafter.

Other inking rolls 79, 80 and 81 are also preferably provided, the roll 79 being arranged for cooperation with roll 67 and roll 80 arranged between and for cooperation with rolls 67 and 68, the roll 81 being preferably arranged for cooperation with roll 68. Rolls 79 and 81 are preferably relatively small rolls to which the ink may be applied in the first instance. Roll 80 is a vibratory roll having a certain amount of longitudinal movement in order to better spread and distribute the ink. This longitudinal movement on the part of roll 80 may be secured by the construction shown in Fig. 12, in which a pin 83 on an adjusting screw 84 may fit in an irregular annular slot 85 in roll 80 so that the rotation of said roll will cause its back and forth longitudinal movement.

The rolls 79, 80 and 81 are preferably mounted in a separate or supplemental roll holder or frame 86. This is preferably carried by the first mentioned roll frame 69 and is preferably made adjustable relatively thereto and also bodily removable therefrom.

As a highly desirably arrangement, and as a matter of further and specific improvement, the roll holder or frame 86 is provided with end portions which fit in appropriate spaces in the frame 69, as shown in Fig. 13, adjusting screws 87 being preferably provided to limit the longitudinal movement of said end portions or even substantially prevent such movement. The set screws 87, however, are not actually tightened against the end members, but are adjusted so as to permit said members 86 to be lifted relatively to holder 69 and even lifted entirely out of the same, if desired. Thus, by arranging the holder 85 in position in holder 69, the rolls 79, 80 and 81 will make contact and cooperate with rolls 67 and 68 and will act in spreading and distributing the ink on the latter, whether the latter be turned by the continuously rotating roll 50, or turned by movement of the carriage back and forth on the bed. When the holder 86 is lifted relatively to holder 69, the rolls 79, 80 and 81 will be separated from rolls 67 and 68.

As a preferred arrangement, provision is made for the lifting of roll holder 69 relatively to traveling carriage 7 and also for lifting supplemental roll holder 86 relatively to roll holder 69 and this is preferably done by mechanism which will accomplish both results. In the arrangement shown, which constitutes one of a variety of mechanisms for accomplishing this result, the carriage 7 is provided with a pair of longitudinally extending swinging arms or members 90, Figs. 5, 7 and 8, these members being pivoted at 91 and extending lengthwise to and through the holder 69. The latter is provided with transverse bars or rods 92, which are normally in position above the arms 90 so that by swinging the arms 90 upwardly they will be brought into contact with the cross bars or rods 92. The supplemental holder 86 is provided with cross bars or rods 94 and toggle lifting members 95 are arranged below the ends of the members 94 but close to the same so that by lifting the toggle members 95 contact will be made with the cross members 94 so that the same may be lifted.

The carriage 7 is provided with upwardly extending standards 96, at the upper end of which a cross shaft 97 is mounted. This shaft 97 carries crank arms 98 to which is pivoted at 99 links 100, the cross shaft 97 being provided with a handle 101 by which the shaft may be turned. The links 100 have lifting connections with the toggle members 95, as, for example, by providing the links 100 with pins 103 adapted to work in slots 104 in the members 95 which latter are pivoted at 106 to the uprights or standards 96. The links 100 also preferably have lifting connections with arms 90, as, for example, by providing arms 90 with pins 107 and providing links 100 with slots 108 for said pins 107. By this arrangement links 100 may be vertically adjusted by the turning of shaft 97 by handle 101 so as to raise and lower both the roll holders 69 and 86. The operation is that when the handle 101 is in a righthand or down position, as indicated in Fig. 3, the links 100 will be down and both holders 69 and 86 will be down so that the rolls carried thereby will be in contact with other rolls. When, however, the handle 101 is swung to the left, or upwardly as it may be called as shown in Figs. 7 and 8, the links 100 will be elevated and pins 103 carried thereby will be moved in slots 104 until they reach the upper ends of said slots at which time the members 95 will be moved upwardly to engage the cross-bars 94, and then a further upward movement of links 100 will lift holder 85, as shown in said Figs. 7 and 8. The same upward movement of links 100 will cause pins 107 to be engaged by the bottom of slots 108 so that the links 100 become effective in raising arms 90 and thereby causing said arms to act against cross-bars 92 and lift the same and thereby lift the main roll holder 69. This elevated position is shown in Figs. 7 and 8. In such position, as best shown in Fig. 8, the rolls 67 and 68 will be lifted so that the roll 67 will be out of contact with roll 50. Also, the holder 86 will be so lifted that the rolls 79, 80 and 81 will be out of contact with rolls 67 and 68. In this way the rolls will be all separated from each other so that they will not gum nor stick to one another, nor cause grooves or depressions to be formed in any of the rolls. Furthermore, if desired, the holder 86 may be lifted entirely out of holder 69 and away from the machine by taking hold of the projecting ends 94ᵃ of cross-bars 94 (Figs. 3 and 11) and lifting holder 86 by these projecting ends. In this way rolls 79, 80 and 81 may be washed and cleaned, if desired. Furthermore, the main roll holder 69 may be lifted bodily from the machine, if desired, by taking hold of the handles 78 and lifting the roll holder out of the machine. This may be done either with the holder 86 in place, or out of place, in holder 69. In this case the locking clips 110 pivoted at 111 to arms 90 and controlled by springs 112, may be lifted or swung upwardly so as to become disengaged from cross-bars 92 and thereby permit holder 69 to be moved or slid out of the machine to the right, referring to Figs. 3, 7 and 8. When holder 69 is replaced in the machine, clips 110 will be swung upwardly to permit ends of cross-bars 92 to slip underneath said clips and be then engaged by the same, as shown in Figs. 3 and 7. The removal of the holder 69 will permit rolls 67 and 68 to be washed and cleaned. If desired, the upper or supplemental holder 86 may be lifted by links 100 without lifting the lower or main holder 69 by swinging handle 100 to a substantially vertical position, in which case links 100 will cause toggle members 95 to engage bar members 94 and elevate holder 86 before pins 107 are engaged by the lower end of slots 108. Thus it will be seen that the various inking rolls may be manipulated and adjusted in order to secure desirable results in the operation of the machine. Removal of holder 69 with all inking rolls permits another complete inking unit to be substituted in its place. Thus different color inks may be readily used, without the need of washing ink rolls, one inking unit having one color ink and another another color, and these being interchangeable in the machine.

As an arrangement for engaging the paper with the printing cylinder, we show a foot lever 115, Fig. 1, controlled by a spring 116 and connected with a rod 117, which in turn is connected with a lever arm 118 pivoted at 119. Arm 118 is adapted to cooperate with roller 120, Fig. 3, on bell crank 121 pivoted at 122 on printing cylinder 6. Bell crank 121 controls a spring controlled paper clip 125, Fig. 5, on the cylinder 6, so that when bell crank 121 is swung upwardly by lever 118 spring clip 125 will be elevated so as to permit a sheet of paper to be interposed between clip 125 and the cylinder surface. Clips 125 carries an abutment 127 to stop the forward movement of the paper. Thus, when the cylinder 6 is in position to receive a sheet of paper, as shown in Figs. 3 and 5, the foot treadle 115 is depressed, thereby lifting clip 125 and permitting insertion of paper, after which treadle 115 is released permitting it to be moved upwardly by spring 116, whereupon clip 125 is depressed by spring 129, thereby causing said clip to engage the sheet of paper and hold it to the cylinder. The cylinder is then turned by the crank arm 14 so as to move the cylinder and its carriage along the bed of the machine. At the opposite end, that is the righthand end in Fig. 1, the roller 131, Fig. 7, on bell crank 121 will strike an abutment 132, Figs. 1 and 9, and cause said bell crank 121 to be swung and the paper clip 125 separated so as to release the paper.

In Fig. 15 we show a modified form of the removable and interchangeable inking roll unit, one form of which is shown in Fig. 13, and previously described. In the modification of Fig. 15 the bearing for the ink roll shaft 67ᵃ and 68ᵃ is formed by members or plates 70ᵃ and 71ᵃ similar to the plates or members 70 and 71, respectively in Fig. 13. In this latter figure, however, arrangement is made to mount or support this bearing composed of members 70ᵃ and 71ᵃ more independently of the inking roll unit than in the arrangement of Fig. 13. To such end the members 70ᵃ and 71ᵃ are held together by screws 72ᵃ, which extend simply through the members 70ᵃ and 71ᵃ and do not extend into the main body portion of the unit or holder 69, as in the case of Fig. 13. In this way the bearing for the rollers 67 and 68 may be spaced from the body member 69 and adjusted relatively thereto for various purposes.

For such spacing and adjustment various means can be used, but a simple arrangement is to provide two (2) screws, 140, 140 which pass through the bottom portion of member 69 and engage one of the members 70ᵃ and 71ᵃ as, for example, the lower member 71ᵃ, passing through apertures 141 in member 70ᵃ, which permit the screws to move freely with reference to said member 70ᵃ. Also another screw 143 is provided and this likewise passes through the lower portion of member 69 and is adapted to contact with and engage the top surface of member 70ᵃ. All of these screws 140, 140 and 143 may be turned relatively to member 69, and to such end are provided with slotted heads, as shown, whereby spacing and adjustment of the bearing may be arranged, as desired.

Oil openings 144 are preferably provided in member 70ᵃ for oiling journals 67ᵃ and 68ᵃ, and slots or grooves 145 are also preferably provided in member 69 for permitting access to apertures 144 by an oil can, or otherwise.

Referring to Fig. 16, we show an arrangement for providing the press with a frisket frame arrangement. This comprises a pair of bars 147 and 148, whereof the upper bar 147 is provided with pins 149 adapted to fit into apertures 150 in lower bar 148. Upper bar 147 is also provided with knurled thumb screws 151, by which it may be readily raised and lowered relatively to lower bar 148 and fitted in position upon the same.

Also bar 148 is provided with a threaded bolt 153 adapted to be screwed outwardly from the end of bar 148 a greater or less distance. By this arrangement bar 148 may be fitted to the bed or frame 2 of the press, as shown in Fig. 2 and bolt 153 may be adjusted so as to hold bar 148 firmly in position. Bar 148 is also provided with apertures 154 into which fit springs 155 for holding a chase of usual design in position. Bar 148 is also provided with pins 157 adapted to fit into apertures 158 in upper bar 147. A sheet or film 159 of transparent material, such as celluloid, or more or less transparent paper, or the like, is shown between bars 147 and 148.

In this way arrangement may be made for accurately placing printing elements in the chase or other holding device in order to use different colored inks. The arrangement is something of a frisket frame arrangement and permits a sheet of transparent material 159 to be fitted between the members 147 and 148 and held in position by pressing member 147 down so that pins 157 punch apertures in sheet 159 and so held the same in position. At this time a proof is taken of the printing element in position in the press. The sheet 159 is then removed by removing upper member 147 and the press is used in connection with such printing element. When another printing element is to be used it is placed in the press and adjusted generally in position and then the film 159 with the proof on it is placed in position with the previously made apertures in register with pins 157 and then the printing element is accurately adjusted by means of the proof or impression on film 159 so that said printing element is in exactly the proper position for its printing to register with that previously done. Member 147 and film 159 is then removed and printing done by the second printing element. This may be done as often as desired.

It will be understood that changes and modifications may be made without departing from the spirit of the invention.

What we claim is:

1. A device of the class specified having a traveling carriage, a printing element, pivoted arms for mounting the printing element on the carriage for vertical relative movement, and automatic means whereby the printing element may be normally held out of printing position during substantially the entire forward or printing stroke of the carriage.

2. A device of the class specified having a traveling carriage, a printing element, pivoted arms for mounting the printing element on the carriage for vertical relative movement, and automatic mechanism by which said cylinder may be normally moved out of printing position for the printing movement of the carriage and also means for maintaining the said cylinder in such position during such printing movement.

3. A device of the class specified having a traveling carriage, a printing element, pivoted arms for mounting the printing element on the carriage for vertical relative movement, and automatic mechanism by which the cylinder may be adjusted transversely of the direction of motion of the carriage so as to place said cylinder in printing or non-printing position, but to normally hold said cylinder in non-printing position.

4. A device of the class specified having a traveling carriage, a printing element, pivoted arms for mounting the printing element on the carriage for vertical relative movement, and automatic mechanism by which the cylinder may be adjusted toward and away from the printing bed of the machine to place the cylinder in printing and non-printing positions, but to normally hold said cylinder in non-printing position.

5. A device of the class specified having a traveling carriage provided with a printing cylinder and also having automatic mechanism by which the cylinder is normally raised relatively to the carriage for the printing movement of the carriage and maintained in such raised position during such movement.

6. A machine of the class specified having a traveling carriage provided with a printing cylinder and spring means on said carriage tending to move and hold the cylinder out of printing position in combination with automatic means for moving the cylinder into printing position in opposition to said spring means.

7. A machine of the class specified having a traveling carriage provided with a printing cylinder and also provided with spring means carried by the said carriage and tending to force the cylinder out of printing position, and cam means adapted to move the cylinder into printing position in opposition to said spring means, in combination with mechanism on the machine frame for controlling said cam means so as to cause the movement of the printing cylinder into or out of printing position.

8. A machine of the class specified having a traveling carriage provided with a printing cylinder and also provided with spring means carried by the said carriage and tending to force the cylinder out of printing position, and cam means adapted to move the cylinder into printing position in opposition to said spring means, in combination with mechanism on the machine frame for controlling said cam means so as to cause the printing cylinder to move into or out of printing position, said mechanism being adapted to actuate the cam means to so move the printing cylinder into non-printing position during the forward or printing stroke of the carriage.

9. A machine of the class specified having a traveling carriage provided with a printing cylinder and also provided with spring means carried by the carriage and tending to force the cylinder out of printing position, and cam means on one end of the machine adapted to move the cylinder into printing position in opposition to said spring means in combination with mechanism on the machine frame for controlling said cam means so as to cause the movement of the printing cylinder into or out of printing position, said mechanism being adapted to actuate the cam means so as to move the printing cylinder into non-printing position during the forward or printing stroke of the carriage, the said mechanism being adapted for operation by the operator so as to cause the movement of the printing cylinder out of printing position during the printing stroke to take place at the option of the operator.

10. A machine of the class specified having a traveling carriage provided with a printing cylinder mounted for adjustment toward and away from the printing form and also provided with spring means tending to move and hold the printing cylinder out of printing position and cam means for moving the cylinder toward the printing form into printing position and holding the same in such position in combination with a controlling lever carriage by the carriage and mounted for movement to actuate said cam means, and a cam device on the machine frame for actuating said controlling lever.

11. A machine of the class specified having a traveling carriage provided with a printing cylinder mounted for adjustment toward and away from the printing form and also provided with spring means tending to move and hold the printing cylinder out of printing position and cam means for moving the cylinder toward the printing form into printing position and holding the same in such position in combination with a controlling lever carried by the carriage and mounted for movement to actuate said cam means, and a cam device on the machine frame for actuating said controlling lever, said cam device being adapted to operate the cylinder controlling cam means to permit the spring means to move the cylinder out of printing position on the forward or printing stroke of the carriage.

12. A machine of the class specified having a traveling carriage provided with a printing cylinder mounted for adjustment toward and away from the printing form and also provided with spring means tending to move and hold the printing cylinder out of printing position and cam means for moving the cylinder toward the printing form into printing position and holding the same in such position in combination with a controlling lever carried by the carriage and mounted for movement to actuate said cam means, and a cam device on the machine frame for actuating said controlling lever, said cam device being adapted to operate the cylinder controlling cam means to permit the spring means to move the cylinder out of printing position on the forward or printing stroke of the carriage; said cam device being provided with means for operation by the machine operator.

13. A machine of the class specified having a traveling carriage provided with a printing cylinder mounted for adjustment toward and away from the printing form and also provided with spring means tending to move and hold the printing cylinder out of printing position and cam means for moving the cylinder toward the printing form into printing position and holding the same in such position in combination with a controlling lever carried by the carriage and mounted for movement to actuate said cam means, and a cam device on the machine frame for actuating said controlling lever, said cam device being adapted to operate the cylinder controlling cam means to permit the spring means to move the cylinder out of printing position on the forward or printing stroke of the carriage; said cam device being provided with means for operation by the machine operator, said last mentioned means comprising a foot lever and a link connected therewith and a swinging arm connected with said link and carrying a swinging lever which carries said cam device.

14. A machine of the class specified having a traveling carriage provided with a printing cylinder mounted for adjustment toward and away from the printing form and also provided with spring means tending to move and hold said cylinder out of printing position and cam means for moving the cylinder into printing position in opposition to said spring means, in combination with mechanism on the machine frame for automatically controlling the position of said cylinder, said mechanism comprising a vertically adjustable arm on the traveling carriage connected with said cam means for actuating the same, and a spring controlled lever provided with a cam adapted to cooperate with an abutment on said arm, said cam being adapted to be swung out of the path of travel of said abutment by the same near the end of the forward movement of the carriage and being also adapted to actuate the abutment and the arm carried thereby to operate the cam means on the carriage when the latter starts on its return movement.

15. A machine of the class specified having a printing cylinder and inking mechanism, support on which the printing cylinder is mounted independently of the inking mechanism comprising a common frame having a lever mounting.

16. A machine of the class specified having a frisket frame mounted on the bed of the machine, means for securing the frame in position on the machine bed, and means for holding an impression sheet to the frisket frame.

17. The combination with a printing press of an impression sheet holder mounted in connection with the bed of the machine and comprising a lower bar with means for detachable connection with the bed and an upper bar with means for mounting in position on the lower bar for holding the impression sheet in position.

18. A machine of the class specified having a traveling carriage, side members pivotally mounted thereon, a printing cylinder journaled and supported in the said side members, and two separate means, each of which is selectively adapted either to raise said cylinder or allow same to remain in a previously lowered position.

19. A machine of the class specified having a traveling carriage, side members pivotally mounted thereon, a printing cylinder journaled and supported in the said side members, means for actuating the side members to raise or lower the said cylinder, said means comprising cams engaging the side members for lowering the cylinder, and springs acting in opposition thereto for raising the said cylinders out of printing position.

20. A machine of the class specified having a traveling carriage, side members pivotally mounted thereon, a printing cylinder journaled and supported in the said side members, and automatic means for actuating the side members to raise the said cylinder or allow same to remain in a previously lowered position.

21. A machine of the class specified having a traveling carriage, side members pivotally mounted thereon, a printing cylinder journaled and supported in the said side members, automatic means for actuating the side members to raise and lower the said cylinder, said automatic means comprising cams engaging the side members and springs acting in opposition to the said cams, and tappet-levers on the machine for controlling the said side-member-engaging-cams.

22. A device of the class specified having a traveling carriage, a printing element, arms for pivotally mounting the printing element on the carriage and automatic means whereby the printing element may be actuated relative to the carriage out of printing position during the forward or printing stroke of the carriage, said automatic means including movable cams.

23. A device of the class specified having a traveling carriage, a printing cylinder, arms for pivotally mounting the printing element on the carriage and automatic mechanism by which the cylinder may be adjusted relatively to the carriage so as to place said cylinder in printing position or allow the cylinder to remain in a previously lowered position.

24. A device of the class specified having a traveling carriage provided with a printing cylinder and also having mechanism on the carriage for adjusting the cylinder relatively thereto, a cam mounted for movement on the machine frame, associated with said adjusting mechanism, and a foot lever arranged to control the position of said cam.

25. A machine of the class specified having a traveling carriage provided with a printing cylinder mounted for adjustment toward and away from the printing form and also having means on the traveling carriage for effecting such adjustment, and mechanism on the machine frame for controlling said means, and a foot lever for operating and controlling the said mechanism on the frame.

26. A machine of the class specified having a traveling carriage, side members pivotally mounted thereon, a printing cylinder journaled and supported in the said side members, means for actuating the side members to raise and lower the said cylinder, said means comprising cams engaging the side members for lowering the cylinder, and a foot-pedal-operated rock shaft for controlling the position of said cams.

27. A machine of the class specified having a traveling carriage, side members pivotally mounted thereon, a printing cylinder journaled and supported in the said side members, and a foot-pedal for actuating the side members to control the position of the said cylinder.

28. A machine of the class described having a traveling carriage, side members mounted thereon, a printing cylinder journaled and supported in the said side members, and two separate means each of which is selectively adapted to raise said cylinder or allow same to remain in a previously lowered position, one of the said separate means being manually operated and the other separate means being automatically operated.

ROBERT O. VANDERCOOK.
EDWARD O. VANDERCOOK.
FREDERICK R. VANDERCOOK.
DAVID D. VANDERCOOK.